US007774913B2

(12) United States Patent
Murdy et al.

(10) Patent No.: US 7,774,913 B2
(45) Date of Patent: Aug. 17, 2010

(54) DEVICE AND METHOD FOR SEPARATING PARTS OF ACOUSTIC SENSORS

(75) Inventors: Richard M. Murdy, Bedford, IN (US); John C. Simmons, Koleen, IN (US); James R. Blake, Washington, IN (US); Timothy L. Barrett, Solsberry, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1013 days.

(21) Appl. No.: 11/518,739

(22) Filed: Sep. 8, 2006

(65) Prior Publication Data

US 2008/0066284 A1 Mar. 20, 2008

(51) Int. Cl.
*B23P 19/00* (2006.01)
*B23P 19/04* (2006.01)

(52) U.S. Cl. ....................... 29/426.5; 29/426.1; 29/239; 254/104; 254/133 R; 81/443; 81/453; 81/485

(58) Field of Classification Search .................. 29/239, 29/270, 281.6, 426.1, 426.5; 254/100, 104, 254/133 R, 134; 81/443, 453, 455, 485

See application file for complete search history.

(56) References Cited

U.S. PATENT DOCUMENTS

| | | | | | |
|---|---|---|---|---|---|
| 1,676,775 | A | * | 7/1928 | Doherty | 81/443 |
| 2,589,572 | A | * | 3/1952 | Rainwater | 29/239 |
| 3,118,220 | A | * | 1/1964 | Somerville et al. | 29/239 |
| 5,810,333 | A | * | 9/1998 | Hickerson et al. | 29/239 |
| 5,852,862 | A | * | 12/1998 | Clayton | 29/239 |

* cited by examiner

*Primary Examiner*—Essama Omgba
(74) *Attorney, Agent, or Firm*—Christopher A. Monsey

(57) ABSTRACT

A device for separating opposed ceramic elements from a metal base member, the device including a rigid body shaped complementarily to an inside surface of the base member and receivable therein. Opposed wedge members are mounted are in the body wall. The body includes a threaded interior surface. A bolt is included for threaded engagement with the interior surface and has a conically-shaped end. Each wedge member is engageable with one of the ceramic elements, such that upon inserting of the body in the base member and threaded movement of the bolt inward to the body, the end of the bolt engages the wedge members to urge the wedge members outward through a body wall to engage the ceramic elements to urge the ceramic elements apart and to separate from the base member.

11 Claims, 12 Drawing Sheets

DEVICE AND METHOD FOR SEPARATING PARTS OF ACOUSTIC SENSORS

STATEMENT OF GOVERNMENT INTEREST

The invention described herein may be manufactured and used by or for the Government of the United States of America for governmental purposes without the payment of any royalty thereon or therefor.

BACKGROUND OF THE INVENTION (1) Field of the Invention

The invention relates to a device for separating ceramic assemblies of acoustic sensors from a mating metallic part and a method for effecting the separation.

(2) Description of the Prior Art

Some naval surface vessels are equipped with acoustic sensors. The disassembly of the acoustic sensors frequently involves damage to ceramic and metallic parts which make up components of each sensor. Because, in part, of the mechanical structure of the sensors, and because, in part, of marine growth thereon, disassembly and repair thereof often proves destructive to the ceramic parts and mating metallic parts, both of which are expensive to purchase or to fabricate.

Thus a need exists for a device which enables separation of the ceramic parts from the metallic part with little or no damage to such parts, and for a method for effecting the separation.

SUMMARY OF THE INVENTION

A general purpose and primary object of the present invention is, therefore, to provide a device which separates mating ceramic and metallic parts of an acoustic sensor from each other with minimal or no damage inflicted on either.

A further object of the present invention is to provide a method for separating mating ceramic and metal parts of an acoustic sensor.

In order to attain the objects described, the present invention provides a device for separating opposed ceramic elements from a metal base member. The device includes rigid body shaped complementarily to an interior surface of the base member and receivable therein.

The body includes opposed wedge members mounted in a wall of the body. The interior surface of the body is threaded and a bolt is included for threaded engagement with the interior surface of the body with the bolt having a generally conically-shaped end.

Each of the wedge members is engageable with one of the ceramic elements, such that upon insertion of the body in the base member and threaded movement of the bolt inwardly of the body, the conically-shaped end of the bolt engages the wedge members to urge the wedge members outward through side walls of the body; thereby, engaging the opposed ceramic elements to urge the ceramic elements apart and from the base member. This urging action separates the ceramic elements from the base member.

The present invention also provides a method for separating opposed ceramic elements from a metal base member. The method includes the steps of providing a device with a rigid body shaped complementarily to an inside surface of the base member and receivable therein, opposed wedge members mounted in walls of the body, an interior surface of the body being threaded, a bolt for threaded engagement with the interior surface of the body and having a conically-shaped end.

The body is inserted in the base member. The bolt is threadedly moved in the body with the conically-shaped end of the bolt engaging the wedge members to urge the wedge members outward through side walls of the body.

The wedge members engage the opposed ceramic elements to urge the ceramic elements apart and from the base member, thereby separating the ceramic elements from the base member.

The above and other features of the invention, including various novel details of construction and combinations of parts and method steps will now be more particularly described with reference to the accompanying drawings and pointed out in the claims. It will be understood that the particular device and method embodying the invention are shown by way of illustration only and not as limitations of the invention. The principles and features of the invention may be employed in various and numerous embodiments without departing from the scope of the invention.

BRIEF DESCRIPTION OF THE DRAWINGS

Reference is made to the accompanying drawings in which is shown an illustrative embodiment of the invention, from which novel features and advantages of the invention will be apparent, and wherein corresponding reference characters indicate corresponding parts throughout the several views of the drawings and wherein.

DESCRIPTION OF THE PREFERRED EMBODIMENTS

Figure 1:
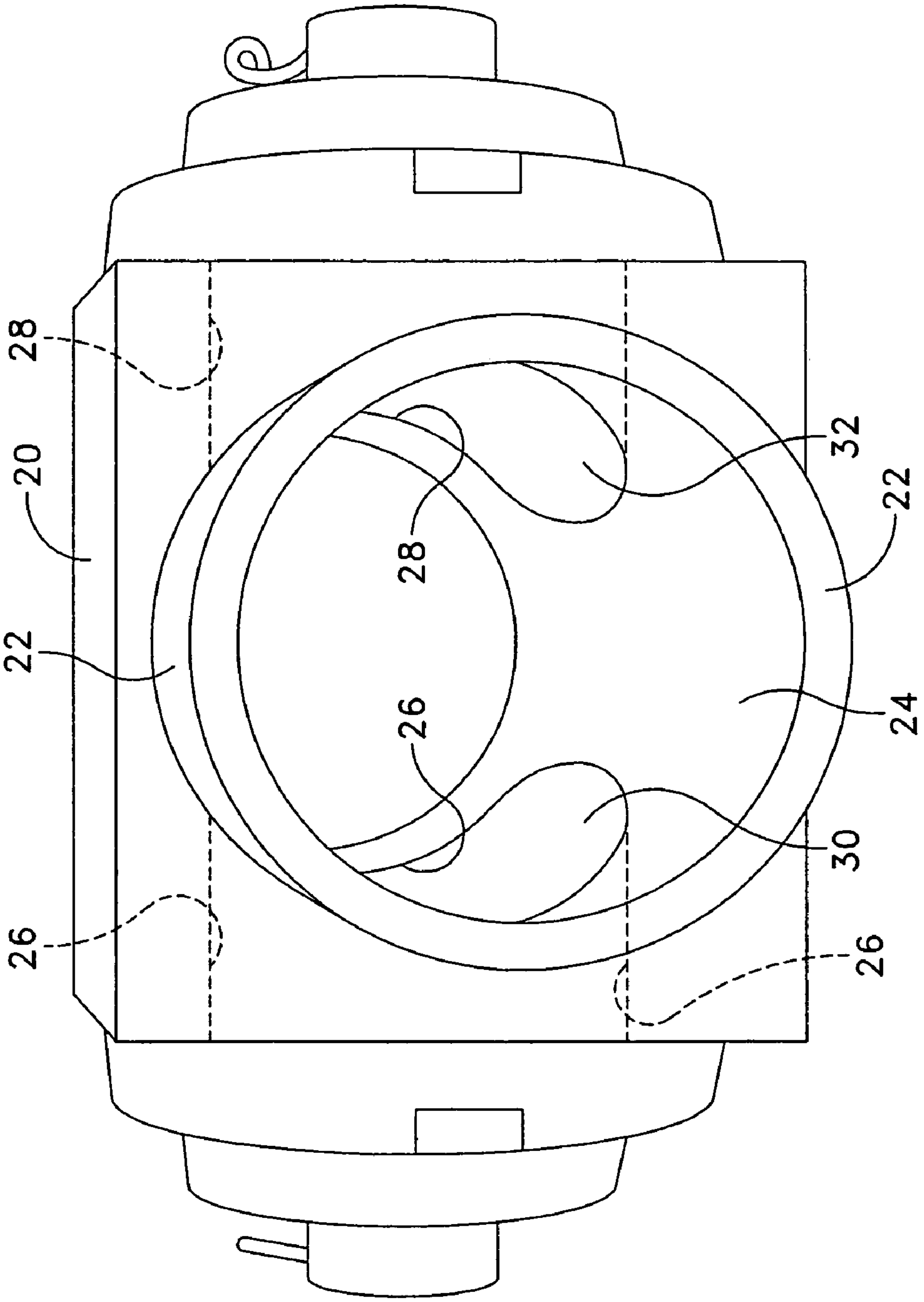
FIG. 1 (PRIOR ART)
FIG. 1 is a perspective view of a portion of a prior art acoustic sensor.
Figure 2:
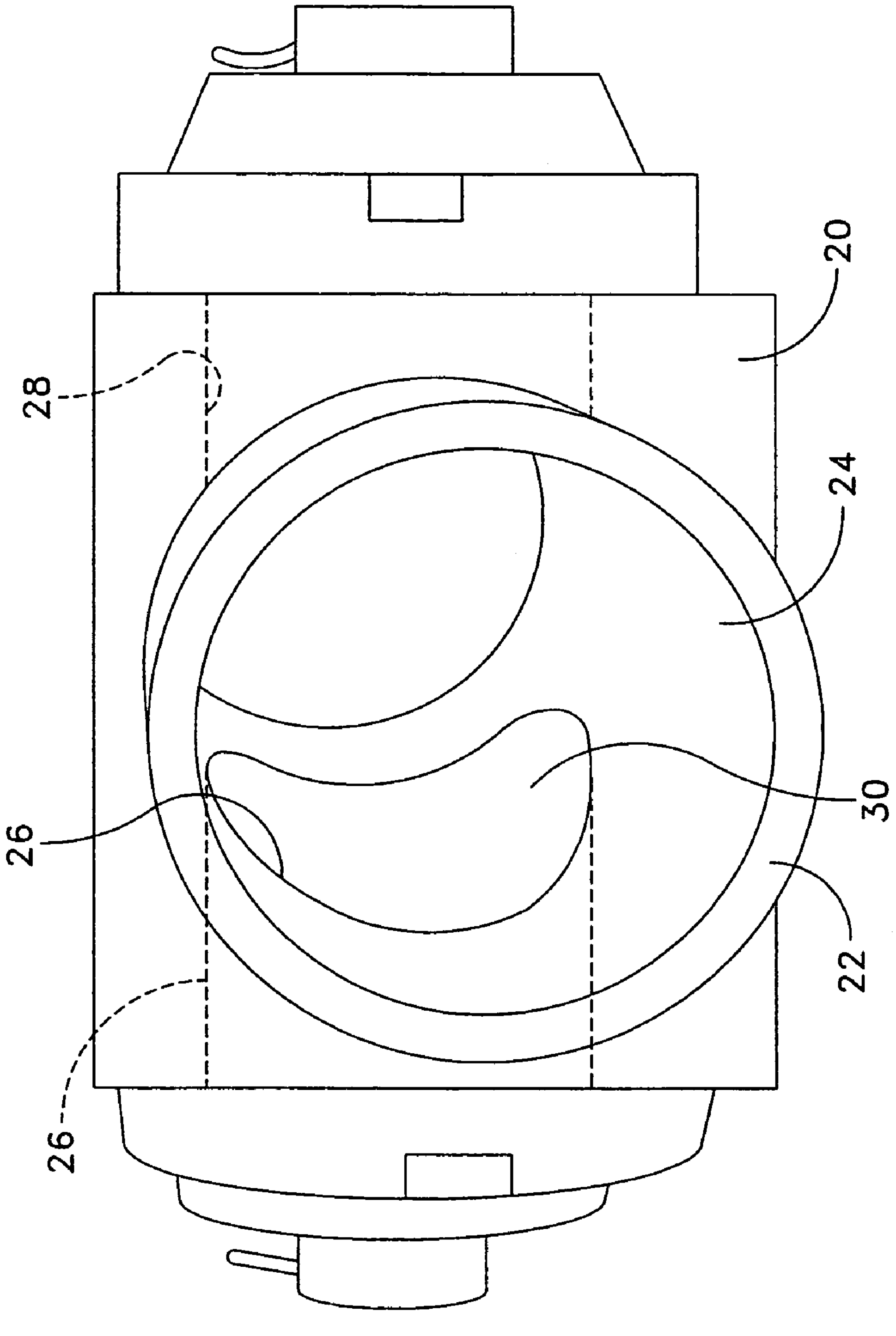
FIG. 2 (PRIOR ART)
FIG. 2 is an alternate perspective view of the prior art sensor.

Referring now to the drawings where like numerals reflect like parts throughout, FIG. 1 and FIG. 2 depict a prior art acoustic sensor, of the type with which the present invention is concerned. The prior art sensor generally comprises a metal base member 20 having a central cylindrically shaped tubular metal member 22 extending therethrough. The central member 22 defines an interior surface 24 having openings 26, 28 therein. Opposed ceramic elements 30, 32 are disposed in the openings 26, 28 in an interior surface wall 24.

Figure 3:
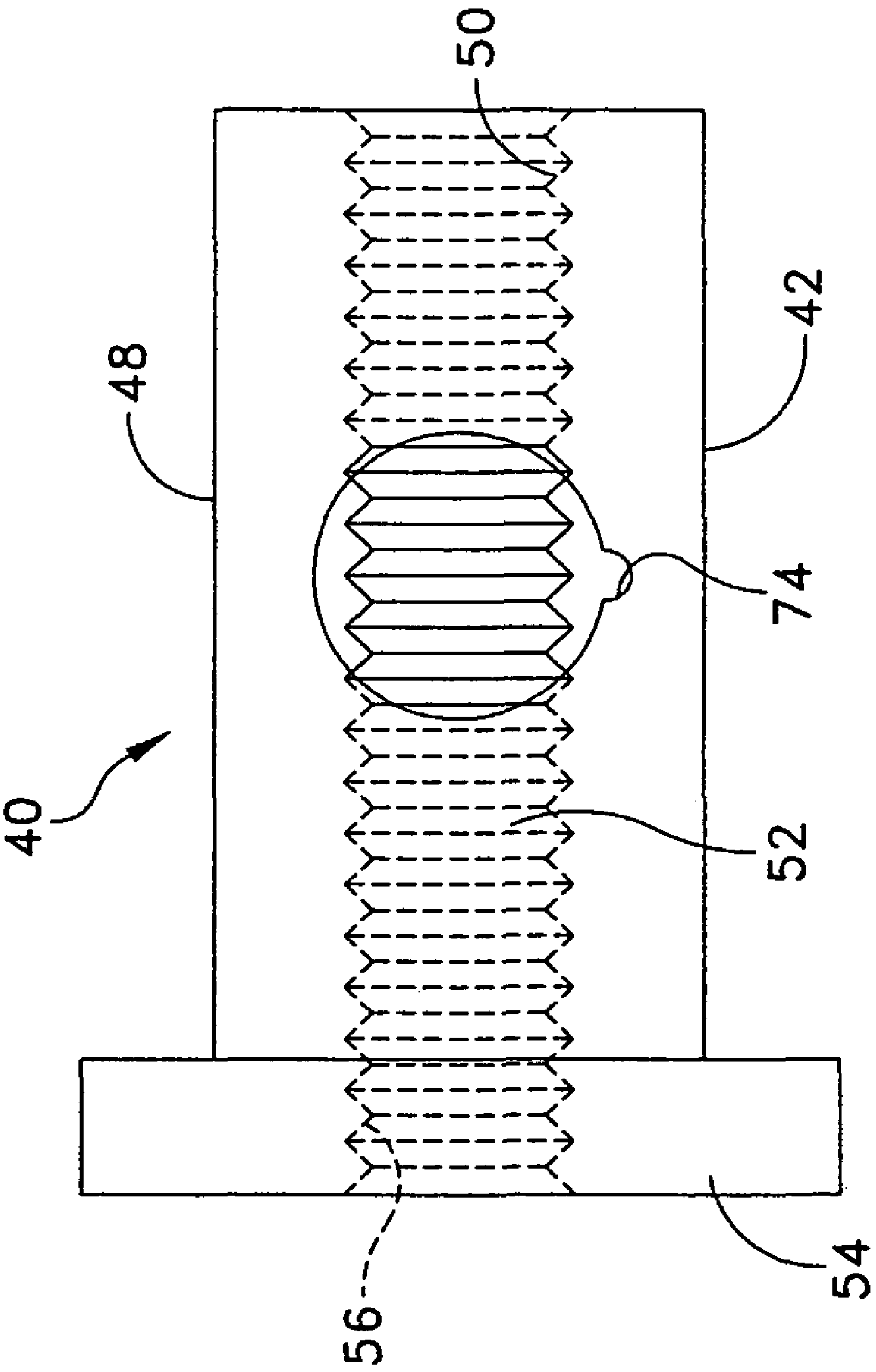
FIG. 3 is a side cross-sectional view of a body portion a device illustrative of the present invention.
Figure 10:
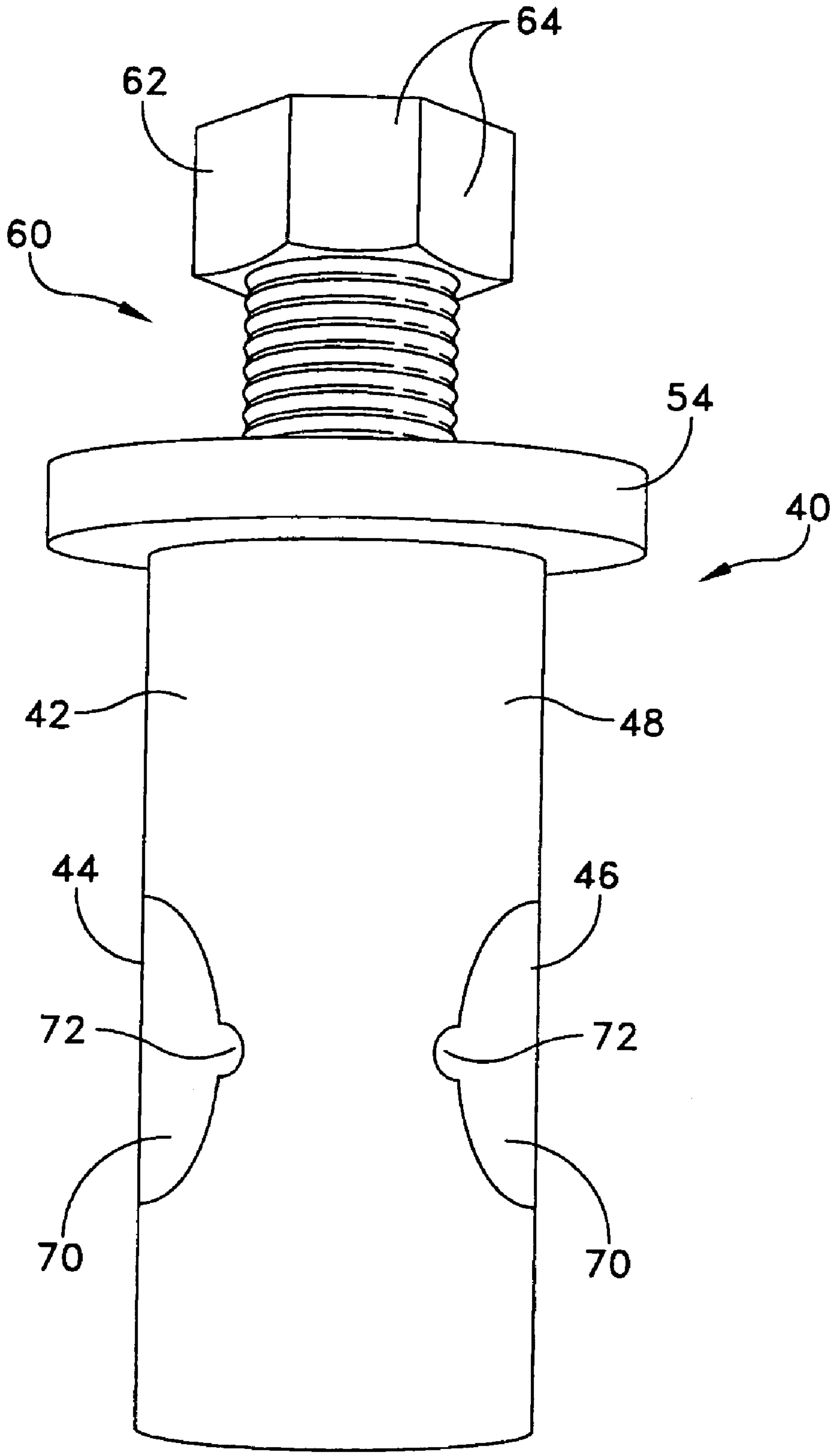
FIG. 10 is a perspective view of the device including the body depicted in FIG. 3, the bolt depicted in FIG. 5, and the wedge members depicted in FIG. 7.

Referring now to the present invention starting with FIG. 3, it will be seen that the invention includes a device 40 primarily for separating the opposed ceramic elements 30, 32 from the metal base member 20. The device 40 primarily includes a cylindrically-shaped rigid body 42, preferably of carbon steel, and shaped complimentarily to the interior surface 24. As will be described further, opposed wedge members 44, 46 are mounted in a wall 48 of the body 42 (See FIG. 10). An interior surface 50 of the wall 48 is provided with screw threads 52 (See FIG. 3).

Figure 4:
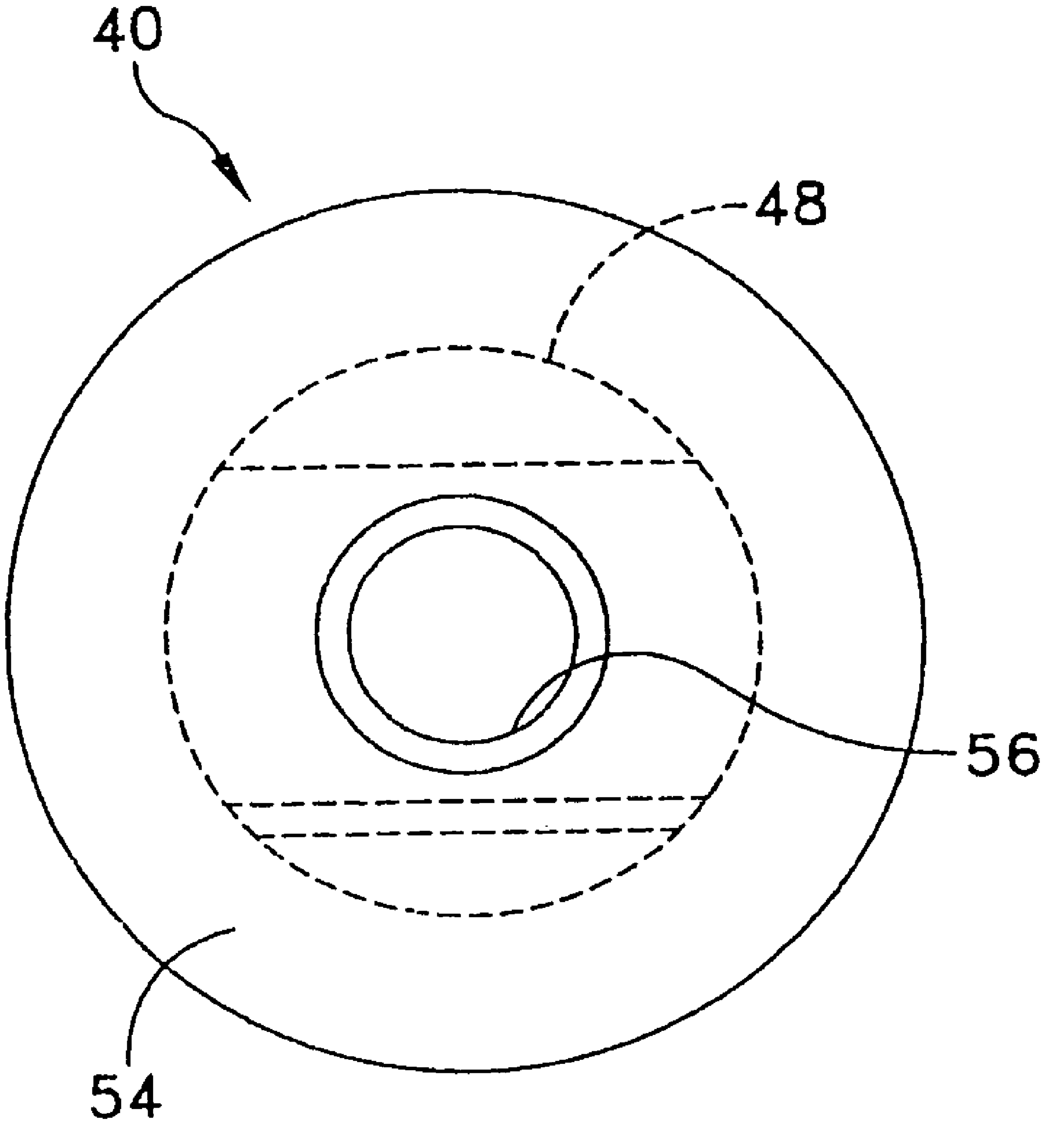
FIG. 4 is an end view of the body portion of the device of the present invention.

The rigid body 42 preferably is provided with a plate 54 on one end thereof, the plate 54 being of a circular configuration and having a threaded orifice 56 centrally thereof to be in alignment with the threaded interior surface 50 (See FIG. 4).

Figure 5:
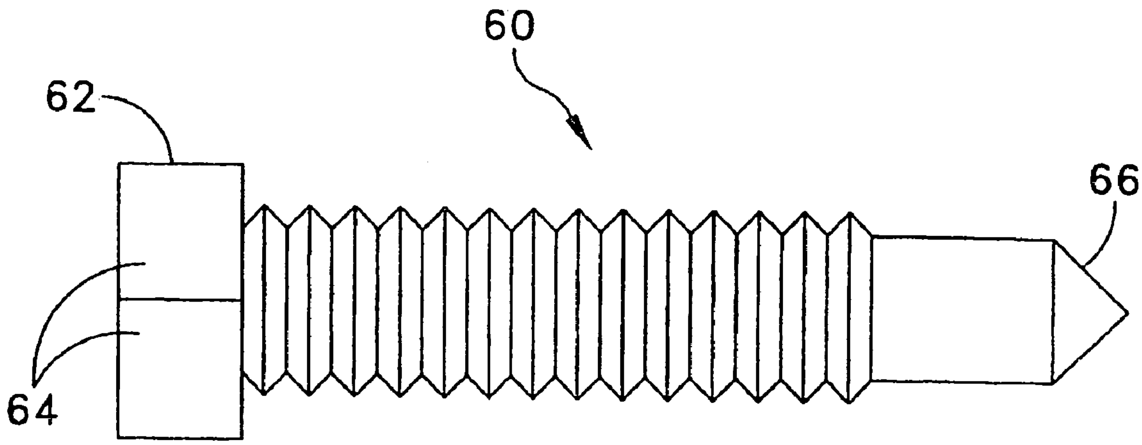
FIG. 5 is a side view of a bolt portion of the device of the present invention.
Figure 6:
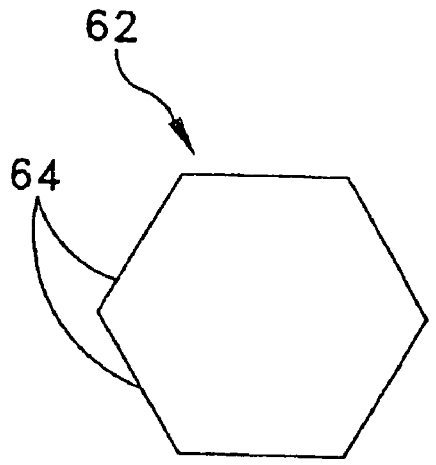
FIG. 6 is an end view of the bolt portion of the device of the present invention.

As shown in FIG. 5 and FIG. 6, the device 40 further includes a threaded bolt 60 having a head 62 on one end thereof and preferably provided with straight sides 64 for a mechanical mover (not shown). The other end of the bolt 60 is provided with a conically-shaped tip 66.

The body 42 inserts into the base member 20, by sliding into the tubular member 22 along the interior surface 24 thereof, with the wedge members 44, 46, aligned with and engaged with the ceramic elements 30, 32 of the acoustic sensor.

Figure 9:
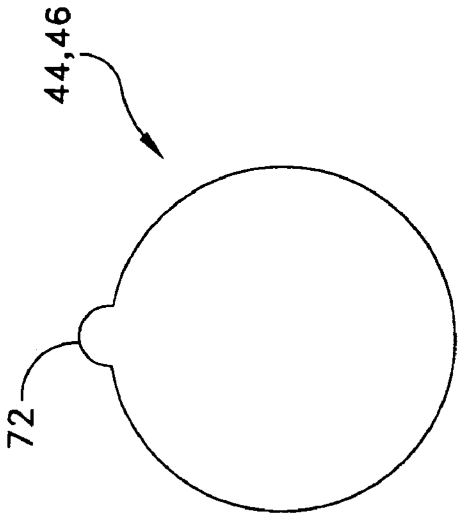
FIG. 9 is an end view of either wedge member of FIG. 7.
Figure 7:
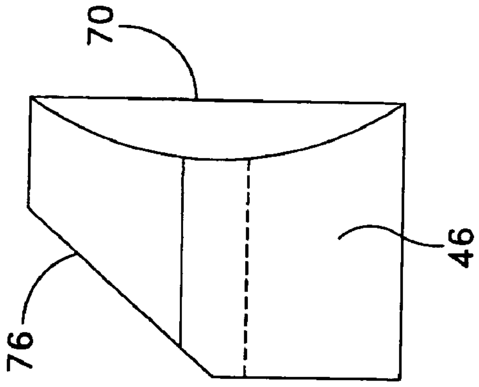
FIG. 7 is a side view of opposed wedge members sized for slidable retention in walls of the body portion of the device.
Figure 7:
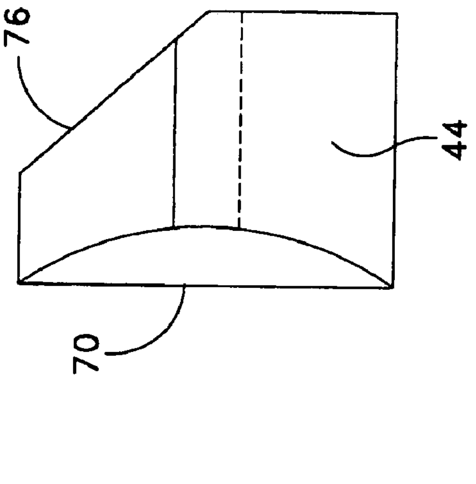
Figure 8:
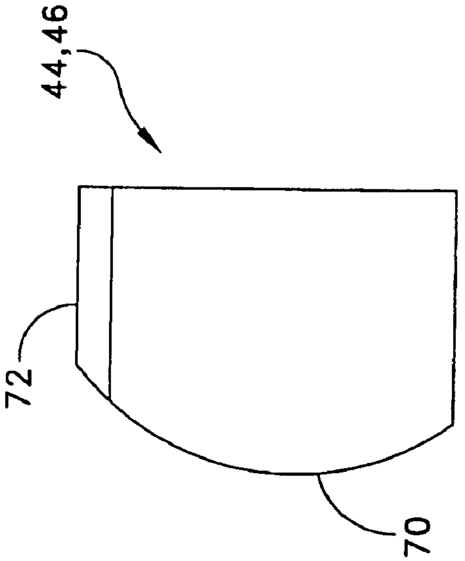
FIG. 8 is an alternate view of either wedge member of FIG. 7.

The wedge members 44, 46 are provided with surfaces 70 (See FIGS. 7, 8 and 10) that are complementary to surfaces of the ceramic elements 30, 32. Each wedge member 44, and 46 is provided with a rib 72 (See FIG. 8 and FIG. 9) disposed in a notch 74 in the wall 48 (See FIG. 3 and FIG. 10) so as to maintain proper orientation of the wedge members.

Figure 11:
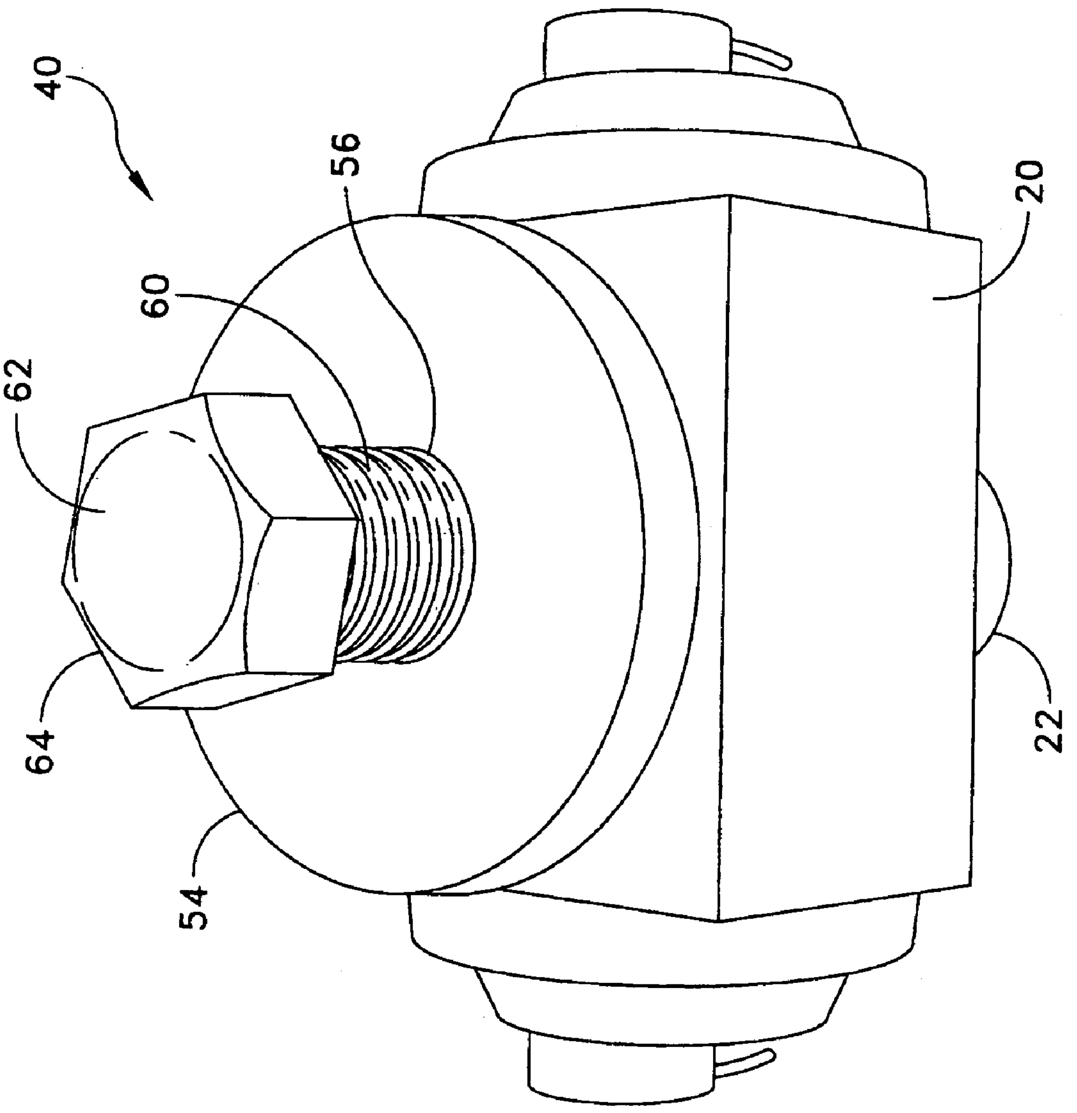
FIG. 11 is a perspective view of the device depicted in FIG. 10 inserted in the sensor of FIG. 2.

In order to separate the ceramic elements 30, 32 from the base member 20, after the aforementioned insertion of the device 40 in the tubular member 22, the bolt 60 is threadedly advanced, as by a wrench, or alternate mechanical mover known in the art, through the threaded orifice 56 and the threaded body interior surface 50 (See FIG. 11).

Figure 12:
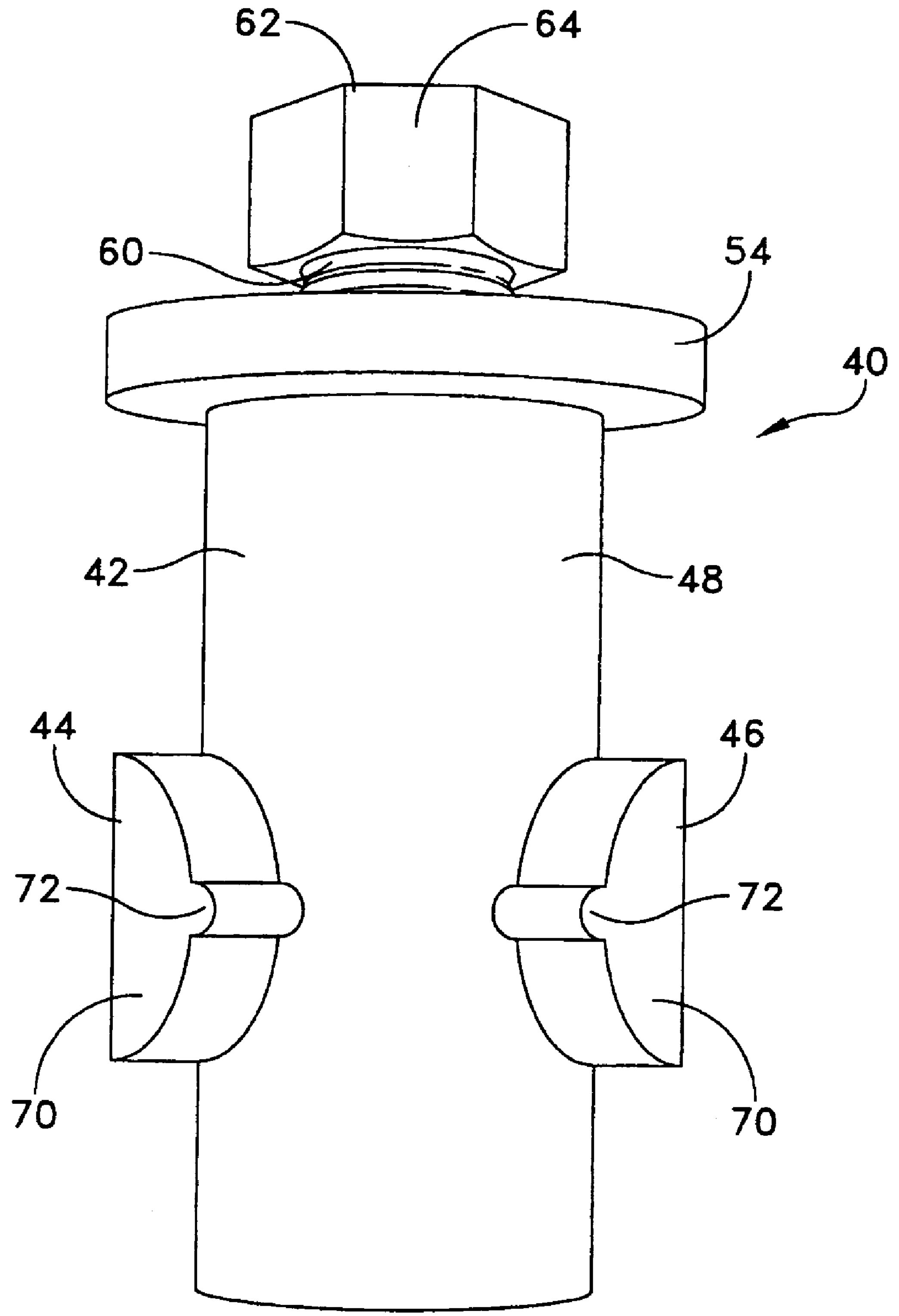
FIG. 12 is a perspective view of the device depicted in FIG. 10, illustrating the manner in which the wedge members extend away from each other when the device bolt portion of the device is advanced in the body portion of the device.
Figure 13:
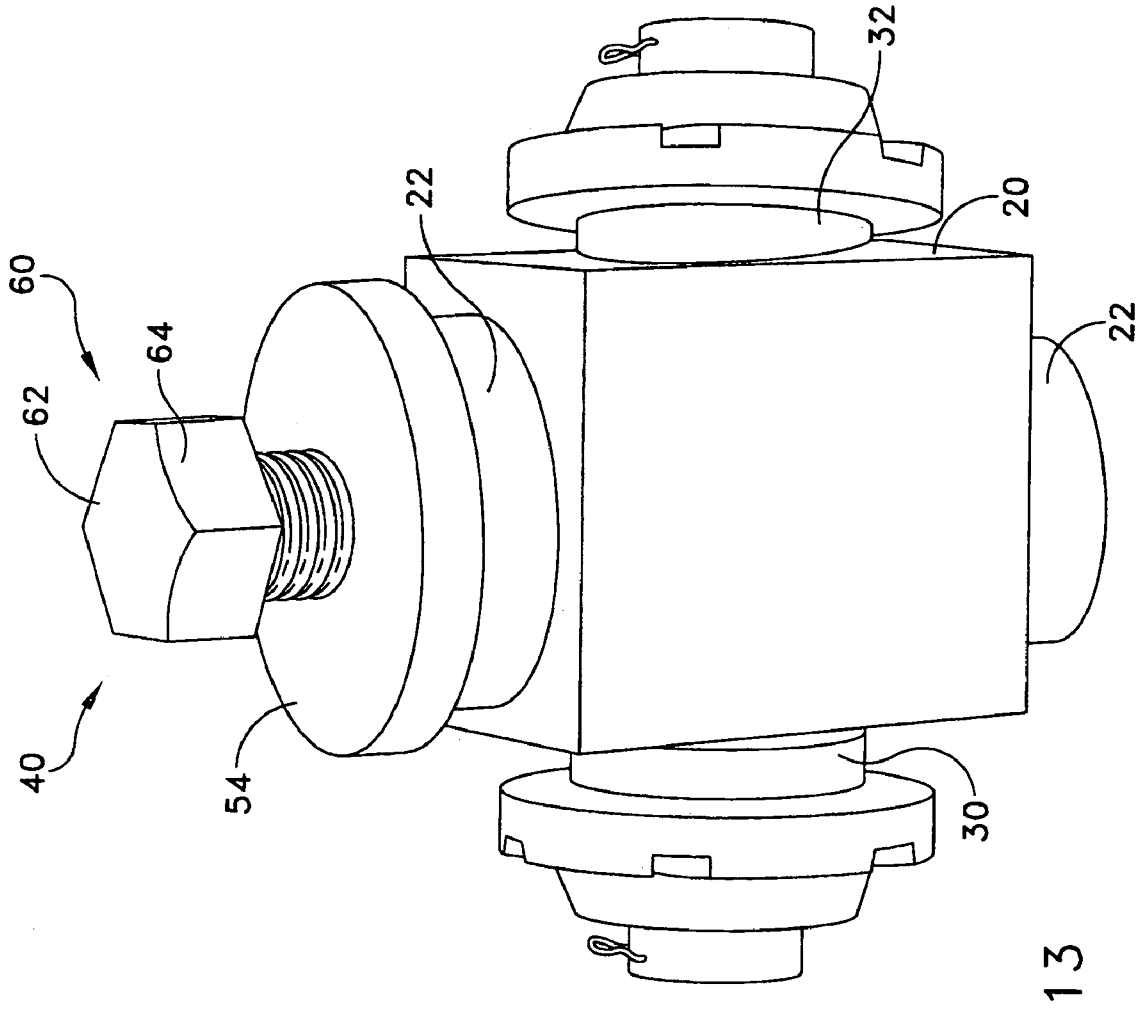
FIG. 13 illustrates the parting of ceramic members from a metal portion of the sensor.
Figure 14:
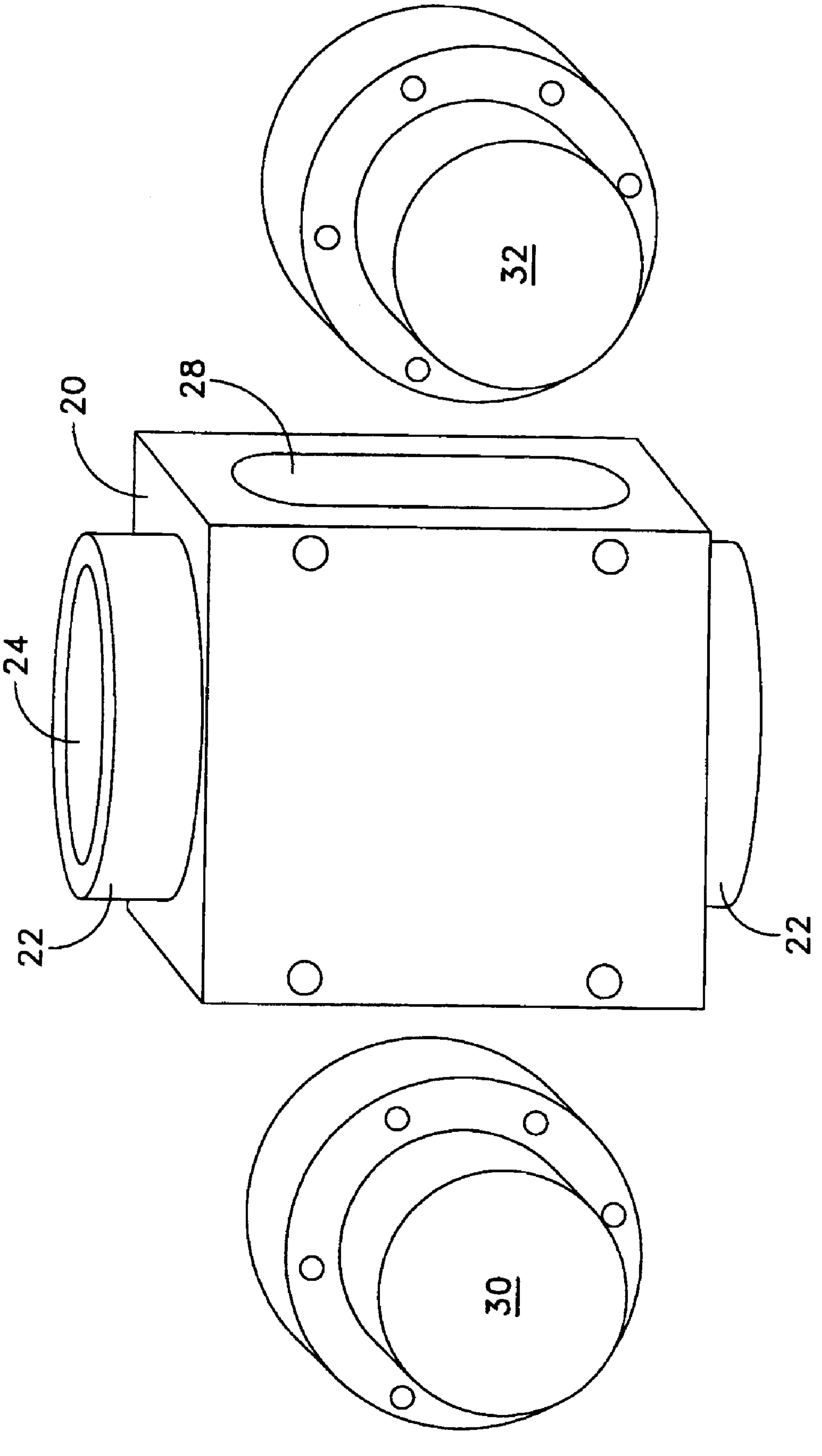
FIG. 14 illustrates ceramic members separated from the metallic portion of the acoustic sensor.

The tip 66 of the bolt 60 encounters the surfaces 70 of the wedge members 44, 46, driving the wedge members radially outward in opposite directions from an axis of the rigid body (See FIG. 12). The wedge members 44, 46 engage the ceramic elements 30, 32 and dislodge the ceramic elements from the base member 20 (See FIG. 13 and FIG. 14). The head 62 engages the plate 54 to stop further inward movement of the bolt 60.

There is thus provided a device and method of use by which ceramic elements are separated from a metal base member with minimal or no damage to the base member and the ceramic elements.

It will be understood that many additional changes in the details, materials, method steps and arrangement of parts, which have been herein described and illustrated in order to explain the nature of the invention, may be made by those skilled in the art within the principles and scope of the invention as expressed in the appended claims.

What is claimed is:

1. A device for separating ceramic elements from a metal base member, said device comprising:

a rigid body shaped with an interior surface being threaded, said body complementarily to an interior surface of an opening of the base member and receivable therein;

opposed wedge members mounted in a wall of said body; and a bolt having a generally conically shaped end for threaded engagement with the interior surface of said body;

wherein each of said wedge members is engageable with one of the ceramic elements, such that upon insertion of said body in the base member and threaded movement of said bolt inward of said body, the conically-shaped end of said bolt engages said wedge members to urge said wedge members outward through the wall of said body to engage opposed ceramic elements to urge the ceramic elements apart from the base member, thereby separating the ceramic elements from the base member.

2. The device in accordance with claim 1 wherein said body is cylindrically shaped.

3. The device in accordance with claim 1 wherein said wedge members are positioned to move radially outward in opposite directions from an axis of said body.

4. The device in accordance with claim 1 wherein said body is provided with a head at one end thereof, the head comprising a plate having a threaded central orifice extending therethrough and aligned with the interior surface of said body.

5. The device in accordance with claim 4 wherein the threaded central orifice of the said plate is aligned with the threaded interior surface of said body.

6. The device in accordance with claim 5 wherein said bolt further comprises a bolt head engageable with said plate.

7. The device in accordance with claim 1 wherein each of said wedge members further comprises a rib and the wall of said body further comprises complementary grooves with each of the ribs.

8. A device for separating ceramic elements from a metal base member having a central tubular component extending therethrough, the ceramic elements being fixed, respectively, in orifices in a side wall of the base member and in the tubular component, such that opposed ends of the ceramic elements are disposed coextensively with an interior surface of the tubular component, said device comprising:

a rigid cylindrical body with an interior surface being threaded, said cylindrical body shaped complementarily to the interior surface of the central tubular component and slidably receivable therein;

opposed wedge members mounted in, and slidably moveable in, opposed openings in a side wall of said cylindrical body, said wedge members being adapted for disposition wholly within said cylindrical body and having outside walls positionable coextensive with an outside wall of said cylindrical body with a surface on each of said wedge members respectively engageable with one of the ends of the opposed ceramic elements; and a bolt having a threaded shank for threaded engagement with the interior surface of said cylindrical body, a head at a first end thereof fixed thereon, and a conically-shaped second end;

whereby upon threaded movement of said bolt inwardly of said cylindrical body, the conically-shaped end of said bolt is engageable with said wedge members to urge said wedge members outward through the outside wall of said cylindrical body to engage the opposed ends of the ceramic elements to urge the ceramic elements apart from each other and away from the base member, thereby separating the ceramic elements from the metal base member.

9. The device in accordance with claim 8 wherein said rigid cylindrical body further comprises a head portion at one end thereof, the head portion comprising a plate having a threaded central orifice therethrough adapted to receive the threaded shank of said bolt.

10. The device in accordance with claim 9 wherein said plate is circular and provided with a diameter exceeding the diameter of said rigid cylindrical body.

11. A method for separating opposed ceramic elements from a metal base member, said method comprising the steps of:

providing a device having a rigid body shaped complementarily to an interior surface of the base member and receivable therein, opposed wedge members mounted in a wall of the body, an interior surface of the body being threaded, a bolt for threaded engagement with the interior surface of the body and having a generally conically-shaped end, each of the wedge members being engageable with one of the ceramic elements;

inserting the body in the base member;

moving the bolt threadedly inward of the body, the conically-shaped end of the bolt engaging the wedge members to urge the wedge members outward through a wall of the body to engage the ceramic elements to urge the ceramic elements apart and from the base member; and separating the ceramic elements from the base member.

* * * * *